US006665128B1

(12) United States Patent
Tai

(10) Patent No.: US 6,665,128 B1

(45) Date of Patent: Dec. 16, 2003

(54) CORRECTIVE LENS FOR COPYING BOOKS

(76) Inventor: Charles C. Tai, 4295 Fuller Hollow Rd., Vestal, NY (US) 13850

( * ) Notice: Subject to any disclaimer, the term of this patent is extended or adjusted under 35 U.S.C. 154(b) by 0 days.

(21) Appl. No.: 10/200,656

(22) Filed: Jul. 23, 2002

(51) Int. Cl.[7] ........................ G02B 13/08; G03B 27/68; G03B 27/62; G03B 15/04

(52) U.S. Cl. ........................... 359/668; 355/25; 355/52; 355/75; 399/204

(58) Field of Search ................................. 359/668, 670, 359/804, 806, 807, 809, 810; 355/25, 52, 75; 399/118, 362, 201, 204, 221, 377; 358/474, 475

(56) References Cited

U.S. PATENT DOCUMENTS 3,609,030 A 9/1971 Sugarman et al. .......... 399/246
4,585,334 A 4/1986 Malyon ....................... 355/25
4,763,173 A 8/1988 Harrigan et al. .............. 355/52
5,071,252 A 12/1991 Matsuura .................... 356/601
5,084,732 A * 1/1992 Tsaur et al. ................. 399/362
5,619,302 A * 4/1997 Wu ............................. 355/25
6,313,954 B1 11/2001 Tai ............................. 359/668

FOREIGN PATENT DOCUMENTS

JP 3555052073 A 4/1980
JP 360186830 A 9/1985
JP 363254437 A 10/1988

* cited by examiner

*Primary Examiner*—Georgia Epps
*Assistant Examiner*—William Choi
(74) *Attorney, Agent, or Firm*—Salzman & Levy

(57) ABSTRACT

An improved corrective lens for copying pages of a book pressed flat upon a document support glass of a xerographic copying machine or document scanner. The corrective lens is shaped to fit in the space between the book pages to be copied and the document glass of the copier. The corrective lens has a pyramidal center extending into the crease of a typical book. The lens extends outwardly from the pyramidal center to form substantially flat side portions that hold the pages of the open book in place.

22 Claims, 11 Drawing Sheets

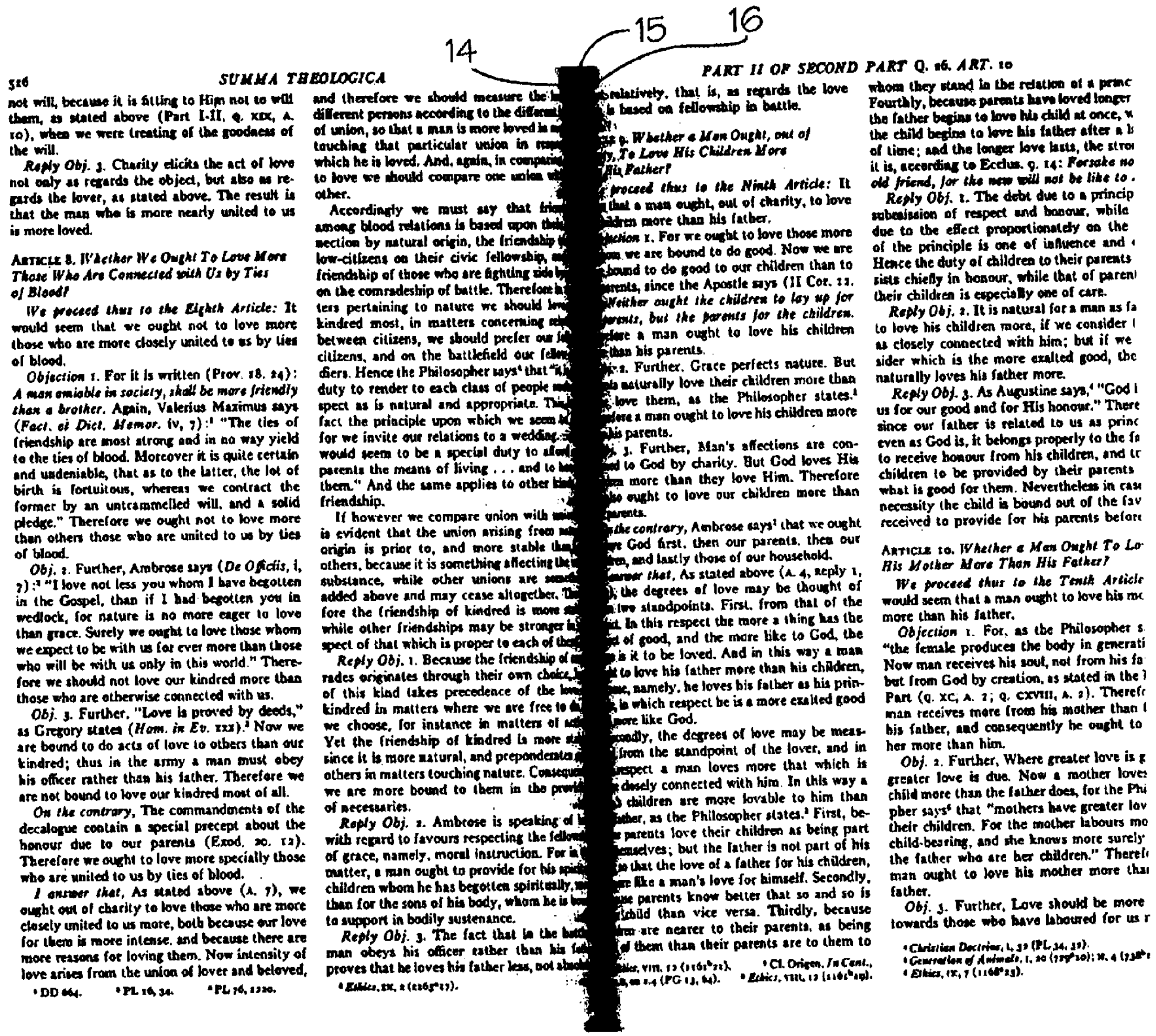

516 *SUMMA THEOLOGICA* not will, because it is fitting to Him not to will them, as stated above (Part I-II, Q. XIX, A. 10), when we were treating of the goodness of the will.

*Reply Obj.* 3. Charity elicits the act of love not only as regards the object, but also as regards the lover, as stated above. The result is that the man who is more nearly united to us is more loved.

ARTICLE 8. *Whether We Ought To Love More Those Who Are Connected with Us by Ties of Blood?*

*We proceed thus to the Eighth Article:* It would seem that we ought not to love more those who are more closely united to us by ties of blood.

*Objection* 1. For it is written (Prov. 18. 24): *A man amiable in society, shall be more friendly than a brother.* Again, Valerius Maximus says (*Fact. et Dict. Memor.* iv, 7):[1] "The ties of friendship are most strong and in no way yield to the ties of blood. Moreover it is quite certain and undeniable, that as to the latter, the lot of birth is fortuitous, whereas we contract the former by an untrammelled will, and a solid pledge." Therefore we ought not to love more than others those who are united to us by ties of blood.

*Obj.* 2. Further, Ambrose says (*De Officiis*, I, 7):[2] "I love not less you whom I have begotten in the Gospel, than if I had begotten you in wedlock, for nature is no more eager to love than grace. Surely we ought to love those whom we expect to be with us for ever more than those who will be with us only in this world." Therefore we should not love our kindred more than those who are otherwise connected with us.

*Obj.* 3. Further, "Love is proved by deeds," as Gregory states (*Hom. in Ev.* XXX).[3] Now we are bound to do acts of love to others than our kindred; thus in the army a man must obey his officer rather than his father. Therefore we are not bound to love our kindred most of all.

*On the contrary*, The commandments of the decalogue contain a special precept about the honour due to our parents (Exod. 20. 12). Therefore we ought to love more specially those who are united to us by ties of blood.

*I answer that*, As stated above (A. 7), we ought out of charity to love those who are more closely united to us more, both because our love for them is more intense, and because there are more reasons for loving them. Now intensity of love arises from the union of lover and beloved, and therefore we should measure the l
different persons according to the different
of union, so that a man is more loved in
touching that particular union in
which he is loved. And, again, in comparing
to love we should compare one union w
other.

Accordingly we must say that frie
among blood relations is based upon the
nection by natural origin, the friendship
low-citizens on their civic fellowship,
friendship of those who are fighting side b
on the comradeship of battle. Therefore in
ters pertaining to nature we should lov
kindred most, in matters concerning re
between citizens, we should prefer our fe
citizens, and on the battlefield our fello
diers. Hence the Philosopher says[4] that "it
duty to render to each class of people
spect as is natural and appropriate. Th
fact the principle upon which we seem
for we invite our relations to a wedding.
would seem to be a special duty to affo
parents the means of living . . . and to h
them." And the same applies to other kind
friendship.

If however we compare union with uni
is evident that the union arising from na
origin is prior to, and more stable than
others, because it is something affecting the
substance, while other unions are some
added above and may cease altogether. Th
fore the friendship of kindred is more st
while other friendships may be stronger in
spect of that which is proper to each of the

*Reply Obj.* 1. Because the friendship of c
rades originates through their own choice,
of this kind takes precedence of the lov
kindred in matters where we are free to d
we choose, for instance in matters of ac
Yet the friendship of kindred is more sta
since it is more natural, and preponderates
others in matters touching nature. Consequ
we are more bound to them in the provi
of necessaries.

*Reply Obj.* 2. Ambrose is speaking of
with regard to favours respecting the fellow
of grace, namely, moral instruction. For in
matter, a man ought to provide for his spir
children whom he has begotten spiritually,
than for the sons of his body, whom he is b
to support in bodily sustenance.

*Reply Obj.* 3. The fact that in the batt
man obeys his officer rather than his fa
proves that he loves his father less, not abso

[1] DD 664. [2] PL 16, 34. [3] PL 76, 1220. [4] *Ethics*, IX, 2 (1165a17).

*PART II OF SECOND PART Q. 26. ART. 10* relatively, that is, as regards the love
is based on fellowship in battle.

9. *Whether a Man Ought, out of*
*y, To Love His Children More*
*His Father?*

*proceed thus to the Ninth Article:* It
that a man ought, out of charity, to love
ildren more than his father.

*ection* 1. For we ought to love those more
m we are bound to do good. Now we are
bound to do good to our children than to
rents, since the Apostle says (II Cor. 12.
*Neither ought the children to lay up for*
*rents, but the parents for the children.*
fore a man ought to love his children
than his parents.

2. Further. Grace perfects nature. But
s naturally love their children more than
love them, as the Philosopher states.[1]
fore a man ought to love his children more
his parents.

3. Further, Man's affections are con-
d to God by charity. But God loves His
n more than they love Him. Therefore
lso ought to love our children more than
parents.

*the contrary*, Ambrose says[2] that we ought
e God first, then our parents, then our
ren, and lastly those of our household.

*answer that*, As stated above (A. 4, reply 1,
), the degrees of love may be thought of
two standpoints. First, from that of the
t. In this respect the more a thing has the
of good, and the more like to God, the
is it to be loved. And in this way a man
t to love his father more than his children,
e, namely, he loves his father as his prin-
, in which respect he is a more exalted good
more like God.

ondly, the degrees of love may be meas-
from the standpoint of the lover, and in
espect a man loves more that which is
closely connected with him. In this way a
children are more lovable to him than
ather, as the Philosopher states.[3] First, be-
parents love their children as being part
emselves; but the father is not part of his
so that the love of a father for his children,
re like a man's love for himself. Secondly,
e parents know better that so and so is
child than vice versa. Thirdly, because
ren are nearer to their parents, as being
of them than their parents are to them to whom they stand in the relation of a princ
Fourthly, because parents have loved longer
the father begins to love his child at once, w
the child begins to love his father after a l
of time; and the longer love lasts, the stro
it is, according to Ecclus. 9. 14: *Forsake no*
*old friend, for the new will not be like to .*

*Reply Obj.* 1. The debt due to a princip
submission of respect and honour, while
due to the effect proportionately on the
of the principle is one of influence and
Hence the duty of children to their parents
sists chiefly in honour, while that of paren
their children is especially one of care.

*Reply Obj.* 2. It is natural for a man as fa
to love his children more, if we consider t
as closely connected with him; but if we
sider which is the more exalted good, the
naturally loves his father more.

*Reply Obj.* 3. As Augustine says,[4] "God l
us for our good and for His honour." There
since our father is related to us as princ
even as God is, it belongs properly to the fa
to receive honour from his children, and t
children to be provided by their parents
what is good for them. Nevertheless in cas
necessity the child is bound out of the fav
received to provide for his parents befor ARTICLE 10. *Whether a Man Ought To Lo*
*His Mother More Than His Father?*

*We proceed thus to the Tenth Article*
would seem that a man ought to love his mo
more than his father.

*Objection* 1. For, as the Philosopher s
"the female produces the body in generati
Now man receives his soul, not from his fa
but from God by creation, as stated in the
Part (Q. XC, A. 2; Q. CXVIII, A. 2). Therefo
man receives more from his mother than
his father, and consequently he ought to
her more than him.

*Obj.* 2. Further, Where greater love is
greater love is due. Now a mother loves
child more than the father does, for the Phi
pher says[6] that "mothers have greater lov
their children. For the mother labours mo
child-bearing, and she knows more surely
the father who are her children." Theref
man ought to love his mother more tha
father.

*Obj.* 3. Further, Love should be more
towards those who have laboured for us

[1] *Ethics*, VIII, 12 (1161b21). [2] Cf. Origen, *In Cant.*, on 2.4 (PG 13, 64). [3] *Ethics*, VIII, 12 (1161b19).
[4] *Christian Doctrine*, I, 32 (PL 34, 32). [5] *Generation of Animals*, I, 20 (729a10); II, 4 (738b. [6] *Ethics*, IX, 7 (1168a25).

Figure 3
PRIOR ART

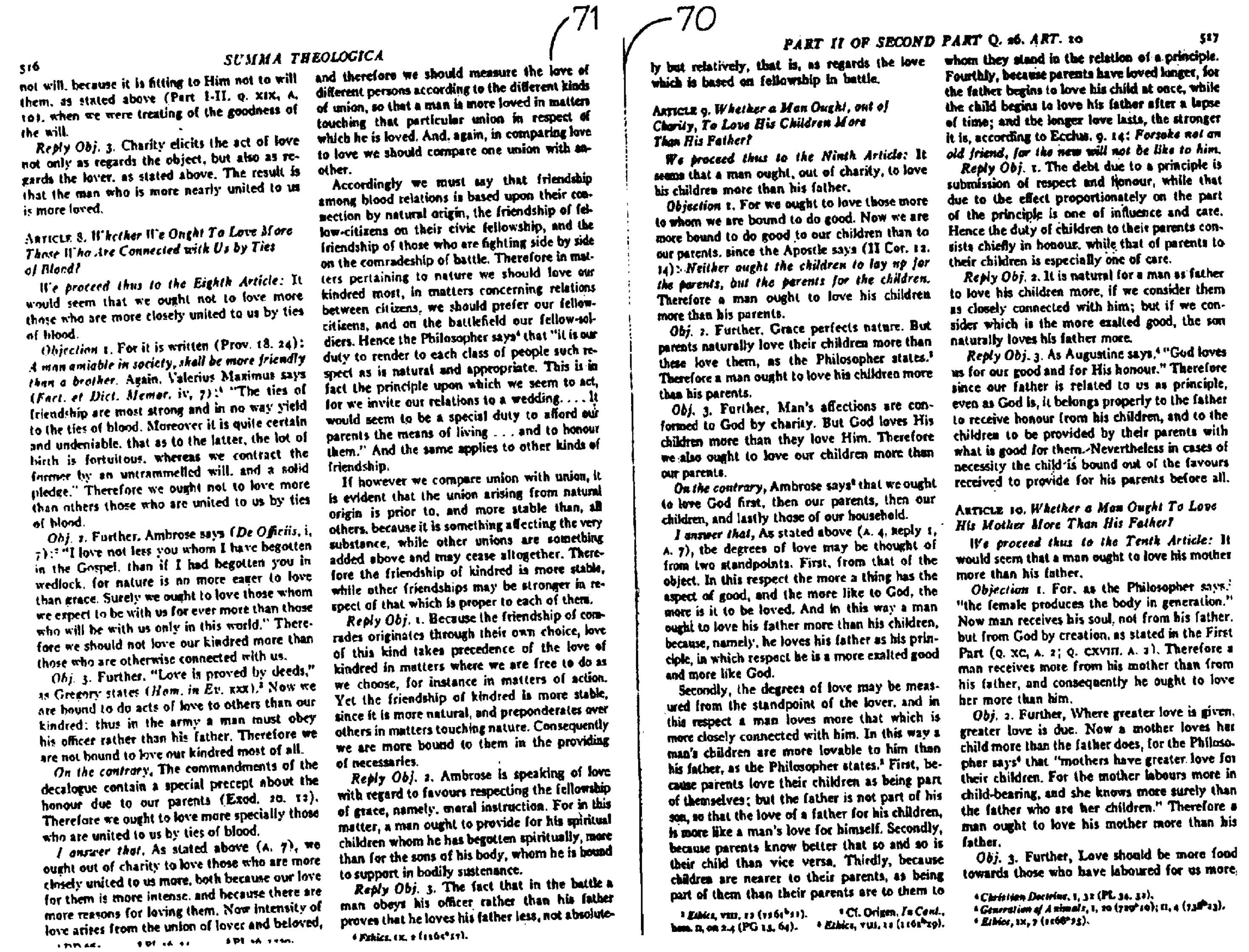

516 SUMMA THEOLOGICA not will, because it is fitting to Him not to will them, as stated above (Part I-II, Q. XIX, A. 10), when we were treating of the goodness of the will.

*Reply Obj.* 3. Charity elicits the act of love not only as regards the object, but also as regards the lover, as stated above. The result is that the man who is more nearly united to us is more loved.

ARTICLE 8. *Whether We Ought To Love More Those Who Are Connected with Us by Ties of Blood?*

*We proceed thus to the Eighth Article:* It would seem that we ought not to love more those who are more closely united to us by ties of blood.

*Objection* 1. For it is written (Prov. 18. 24): *A man amiable in society, shall be more friendly than a brother.* Again, Valerius Maximus says (*Fact. et Dict. Memor.* iv, 7):[1] "The ties of friendship are most strong and in no way yield to the ties of blood. Moreover it is quite certain and undeniable, that as to the latter, the lot of birth is fortuitous, whereas we contract the former by an untrammelled will, and a solid pledge." Therefore we ought not to love more than others those who are united to us by ties of blood.

*Obj.* 2. Further, Ambrose says (*De Officiis*, i, 7):[2] "I love not less you whom I have begotten in the Gospel, than if I had begotten you in wedlock, for nature is no more eager to love than grace. Surely we ought to love those whom we expect to be with us for ever more than those who will be with us only in this world." Therefore we should not love our kindred more than those who are otherwise connected with us.

*Obj.* 3. Further, "Love is proved by deeds," as Gregory states (*Hom. in Ev.* xxx).[3] Now we are bound to do acts of love to others than our kindred: thus in the army a man must obey his officer rather than his father. Therefore we are not bound to love our kindred most of all.

*On the contrary,* The commandments of the decalogue contain a special precept about the honour due to our parents (Exod. 20. 12). Therefore we ought to love more specially those who are united to us by ties of blood.

*I answer that,* As stated above (A. 7), we ought out of charity to love those who are more closely united to us more, both because our love for them is more intense, and because there are more reasons for loving them. Now intensity of love arises from the union of lover and beloved, and therefore we should measure the love of different persons according to the different kinds of union, so that a man is more loved in matters touching that particular union in respect of which he is loved. And, again, in comparing love to love we should compare one union with another.

Accordingly we must say that friendship among blood relations is based upon their connection by natural origin, the friendship of fellow-citizens on their civic fellowship, and the friendship of those who are fighting side by side on the comradeship of battle. Therefore in matters pertaining to nature we should love our kindred most, in matters concerning relations between citizens, we should prefer our fellow-citizens, and on the battlefield our fellow-soldiers. Hence the Philosopher says[4] that "it is our duty to render to each class of people such respect as is natural and appropriate. This is in fact the principle upon which we seem to act, for we invite our relations to a wedding. . . . It would seem to be a special duty to afford our parents the means of living . . . and to honour them." And the same applies to other kinds of friendship.

If however we compare union with union, it is evident that the union arising from natural origin is prior to, and more stable than, all others, because it is something affecting the very substance, while other unions are something added above and may cease altogether. Therefore the friendship of kindred is more stable, while other friendships may be stronger in respect of that which is proper to each of them.

*Reply Obj.* 1. Because the friendship of comrades originates through their own choice, love of this kind takes precedence of the love of kindred in matters where we are free to do as we choose, for instance in matters of action. Yet the friendship of kindred is more stable, since it is more natural, and preponderates over others in matters touching nature. Consequently we are more bound to them in the providing of necessaries.

*Reply Obj.* 2. Ambrose is speaking of love with regard to favours respecting the fellowship of grace, namely, moral instruction. For in this matter, a man ought to provide for his spiritual children whom he has begotten spiritually, more than for the sons of his body, whom he is bound to support in bodily sustenance.

*Reply Obj.* 3. The fact that in the battle a man obeys his officer rather than his father proves that he loves his father less, not absolutely but relatively, that is, as regards the love which is based on fellowship in battle.

[4] *Ethics*, IX, 2 (1165a17).

PART II OF SECOND PART Q. 26. ART. 10 517

ARTICLE 9. *Whether a Man Ought, out of Charity, To Love His Children More Than His Father?*

*We proceed thus to the Ninth Article:* It seems that a man ought, out of charity, to love his children more than his father.

*Objection* 1. For we ought to love those more to whom we are bound to do good. Now we are more bound to do good to our children than to our parents, since the Apostle says (II Cor. 12. 14): *Neither ought the children to lay up for the parents, but the parents for the children.* Therefore a man ought to love his children more than his parents.

*Obj.* 2. Further, Grace perfects nature. But parents naturally love their children more than these love them, as the Philosopher states.[1] Therefore a man ought to love his children more than his parents.

*Obj.* 3. Further, Man's affections are conformed to God by charity. But God loves His children more than they love Him. Therefore we also ought to love our children more than our parents.

*On the contrary,* Ambrose says[2] that we ought to love God first, then our parents, then our children, and lastly those of our household.

*I answer that,* As stated above (A. 4, Reply 1, A. 7), the degrees of love may be thought of from two standpoints. First, from that of the object. In this respect the more a thing has the aspect of good, and the more like to God, the more is it to be loved. And in this way a man ought to love his father more than his children, because, namely, he loves his father as his principle, in which respect he is a more exalted good and more like God.

Secondly, the degrees of love may be measured from the standpoint of the lover, and in this respect a man loves more that which is more closely connected with him. In this way a man's children are more lovable to him than his father, as the Philosopher states.[3] First, because parents love their children as being part of themselves; but the father is not part of his son, so that the love of a father for his children, is more like a man's love for himself. Secondly, because parents know better that so and so is their child than vice versa. Thirdly, because children are nearer to their parents, as being part of them than their parents are to them to whom they stand in the relation of a principle. Fourthly, because parents have loved longer, for the father begins to love his child at once, while the child begins to love his father after a lapse of time; and the longer love lasts, the stronger it is, according to Ecclus. 9. 14: *Forsake not an old friend, for the new will not be like to him.*

*Reply Obj.* 1. The debt due to a principle is submission of respect and honour, while that due to the effect proportionately on the part of the principle is one of influence and care. Hence the duty of children to their parents consists chiefly in honour, while that of parents to their children is especially one of care.

*Reply Obj.* 2. It is natural for a man as father to love his children more, if we consider them as closely connected with him; but if we consider which is the more exalted good, the son naturally loves his father more.

*Reply Obj.* 3. As Augustine says,[4] "God loves us for our good and for His honour." Therefore since our father is related to us as principle, even as God is, it belongs properly to the father to receive honour from his children, and to the children to be provided by their parents with what is good for them. Nevertheless in cases of necessity the child is bound out of the favours received to provide for his parents before all.

ARTICLE 10. *Whether a Man Ought To Love His Mother More Than His Father?*

*We proceed thus to the Tenth Article:* It would seem that a man ought to love his mother more than his father.

*Objection* 1. For, as the Philosopher says,[5] "the female produces the body in generation." Now man receives his soul, not from his father, but from God by creation, as stated in the First Part (Q. XC, A. 2; Q. CXVIII, A. 2). Therefore a man receives more from his mother than from his father, and consequently he ought to love her more than him.

*Obj.* 2. Further, Where greater love is given, greater love is due. Now a mother loves her child more than the father does, for the Philosopher says[6] that "mothers have greater love for their children. For the mother labours more in child-bearing, and she knows more surely than the father who are her children." Therefore a man ought to love his mother more than his father.

*Obj.* 3. Further, Love should be more fond towards those who have laboured for us more,

[1] *Ethics*, VIII, 12 (1161b21).
[2] Cf. Origen, *In Cant.*, hom. II, on 2.4 (PG 13, 64).
[3] *Ethics*, VIII, 12 (1161b29).
[4] *Christian Doctrine*, I, 32 (PL 34, 32).
[5] *Generation of Animals*, I, 20 (729a10); II, 4 (738b23).
[6] *Ethics*, IX, 7 (1168a25).

Figure 10

CORRECTIVE LENS FOR COPYING BOOKS

FIELD OF THE INVENTION

The present invention relates to copying methods and apparatus and, more particularly, to a method and apparatus for correcting for the distortion that results when copying pages of a book pressed against the document support glass of a copying machine or a document scanner.

BACKGROUND OF THE INVENTION

Ever since the introduction of xerographic photocopiers many users have experienced difficulty in producing clear, non-distorted copies from opened books or volumes that have been pressed upon the flat document glass. This difficulty is mainly due to the fact that conventional photographic copiers are designed to produce copies from documents (generally, single sheets) that lay flat upon the document glass. Textbooks with hard bindings cannot be so oriented.

The crease of a typical textbook generally pyramids upwardly away from the glass, thus causing an upside-down "V-shaped" surface. This is especially so for thick books with hard covers. The crease falls outside of the focal length range for which the copier lens can properly project the image of the book onto the image receiving medium or pre-charged paper. In other words, the crease cannot be focused properly to provide an undistorted image. As a result, the copied crease is often blurred, distorted, and darkened.

In order to make the copies more legible, the operator of the copier is required to forcibly press on the backing of the book as it rests upon the glass. Sometimes this will work. However, many times the binding is too stiff and the crease cannot be projected into the fold. pressing with excessive force is also risky, as it may cause damage to the binding. In some cases, an immoderate amount of force may even break the glass.

DISCUSSION OF THE RELATED ART

In the last twenty-five years numerous apparatus have been invented or proposed to solve this problem. Most of them either do not work, or are impractical. A simple one-piece optical corrective or compensation lens was invented to cure these problems and was described in U.S. Pat. No. 6,313,954, granted to the present inventor on Nov. 6, 2001 for CORRECTIVE LENS FOR COPYING BOOKS.

The optical corrective lens of the '954 patent is basically composed of three parts: a thick curvilinear optical lens in the center, and two very thin extension leaves or arms spread outward from each side of the center lens. The only optically functional part of the lens is the center portion. The main purpose of the extension leaves is to eliminate the glitches in the copies caused by light deflections along the edges of the center lens. The surface contours of the center lens are basically a composition of sections of circular surfaces or circular-like elliptical and parabolic surfaces.

Although the results were not perfect, the lens worked for making duplications from book pages using a commercial xerographic copier. However, it was later revealed that the lens was difficult to manufacture using any of the existing conventional and economical plastic fabrication processes like injection molding, blowing, or continuous extruding. This is due to the extremely thin cross-section of the large extension leaves, which had to be seamlessly fabricated as an integral part of a relatively thick center lens. To improve the lens's manufacturability, the thickness of the extension leaves must be substantially increased. However, the increase of the extension leaves will also increase the profile of the center lens; otherwise, the radius of each constituent section of the top surface of the center lens must be reduced accordingly. Either way, the optical performance of the lens will be substantially worsened.

Several such lenses were built to fine tune this design for thicker (0.050 inch) extension leaves. The quality of a typical xerographic copy of the pages of a thick reference book produced using a typical xerographic copier with any of these trial lenses is obviously much poorer than the similar copy demonstrated in Tai's patent application. There are two darkened strips proximate the centerline. Characters close to these darkened strips are over-magnified and darker than the rest of the characters in the copy. Characters in center areas a little bit farther away from the centerline are still somewhat insufficiently decompressed or under-magnified. Copies with such poor quality are unsightly but may still be considered acceptable for reading purposes. However, its application to text scanning and digitizing is questionable due to more stringent decompression requirements.

After a laborious attempt to improve the performance of the lens, it was clear that the types of surfaces proposed and suggested to construct the lens's most crucial bottom surface are inadequate. Thus, it was found that to make the basic design of this lens work properly, adequate curvature must be found for the constituent sections of the most crucial bottom surface. Without scientific theory or principle available to guide the work, some innovation or breakthrough was needed.

In U.S. Pat. No. 3,609,030, issued to Meyer L. Sugarman et al. on Sep. 28, 1971 for ELECTROSTATIC BOOK COPIER, a tabletop electrostatic book copier is illustrated, having an exposure station on its top. The book to be copied is placed on top of a vertical exposure station and the image of the book is projected directly to the pre-charged paper through a mirror and an optical lens. The image of the book surface is projected using an ordinary optical lens and a mirror found in conventional copiers. The image is projected directly onto a charged paper instead of onto an image-receiving medium. There is no teaching or suggestion of using a distorted lens to refocus the page of the document.

In U.S. Pat. No. 4,585,334, issued to Brian R. Malyon on Apr. 29, 1986 for DOCUMENT COPIERS, a document copier is shown that incorporates a scanner with a forty-five degree slanted scanning window glass mounted at the end of a rectangular housing. The ninety-degree corner, or the so-called wedge, between the window glass and one of the sidewalls points downwardly. The book to be copied is placed on a rack below the scanner window glass. The rack is constructed from two flat frames connected together at a ninety-degree angle, with its opening facing upward. The book to be copied is faced upwardly and rests on the rack with its inside pages opened at a ninety-degree angle. During the copying process, the rack first moves up, bringing the half opened book toward the scanner. It then stops at a predetermined position and keeps a surface of the book page away from the scanner window to prevent damaging the book. In this position, the opposite inside page of the book is under the scanner housing, facing the sidewall. It may or may not touch the slanted sidewall. The scanner then scans the surface of the inside page of the book under its window.

In U.S. Pat. No. 4,763,173, issued to Michael E. Harrigan et al. on Aug. 9, 1988 for IMAGING SYSTEM FOR COMPENSATING FOR IMAGE DISTORTION DUE TO WRINKLED OR CURLED DOCUMENTS, a document imaging system is shown including a positive, aspheric, Fresnel lens. The purpose of the system is to compensate for small, smooth wrinkles and curls of the original document to be copied.

In U.S. Pat. No. 5,071,252, issued to William Howseman, Jr. on Dec. 10, 1991 and Japanese patent No. JP 360,186, 360A, issued to Kenich Watabiki, it is suggested that book size bundles of numerous short optical fibers shaped in a nearly flat triangular prism be placed between an opened book and the copier's document glass to optically bring the images of the book pages to the copier's document supporting glass. Neither of these inventors addressed the solutions of other related problems such as the illumination of the book page's surfaces, the solution to the decompression of the text recorded on the book pages, etc. The principles and mechanisms they employed are very different from that used in the invention proposed in this application.

In Japanese patent Number JP 63,254,437A issued to Tatsuya Shimoda on Oct. 21, 1988, the use of an optical apparatus composed of two slightly bent convex lenses connected together by a flexible hinge is suggested for compensating the pyramiding of the book pages adjacent to the book's binding. In the application, the flat ridge formed by the thin edges and the flexible hinge is proposed to be placed directly under the crease 7 formed by the facing inside book pages and the flat portions of the book pages 4 residing on the thicker center portions of the constituent lenses. Since convex lenses do not project the images of objects to a viewer closer than the lenses' viewer side surfaces, the optical compensating effect is very limited for portions of book surfaces deep in the crease where the most compensation is needed. In addition, the thick center portions of the lenses under the flat portions of the book pages will adversely raise the entire profile of the book page's surfaces higher and, thus, the expected optical compensation effect is significantly further reduced. Although this invention also attempts to use convex lenses to compensate the added height of the portions of book pages adjacent the binding, it uses a very different mechanism and the spirit of his design is upon the flexible hinge that connects the edges of two convex lenses. That is very different from the single rigid lens design proposed in the invention described in this application.

In Japanese patent Number JP 55,052,073A issued to Hirosuke Okura on Apr. 16, 1980, a flat prism made of a transparent material is proposed to be used for compensating the added book page surface height in the crease formed adjacent to the binding of a book. prism is well known for its ability to deflect the rays of a light beam when the light beams approach and leave the prism with an angle. It neither has the capability to reposition the image of an object nor of deflecting a light beam when it strikes or leaves the prism perpendicular to any of its flat surfaces. Therefore, it is obvious that this device doesn't have the capability of repositioning the image of the book pages' surfaces to help solve the blurring or image compression problem that the invention in this application attempts to solve.

In the aforementioned U.S. Pat. No. 6,313,954, issued to Chgarles C. Tai on Nov. 6, 2001 for CORRECTIVE LENS FOR COPYING BOOKS, a corrective lens for copying books is described that is capable of compensating the pyramiding of the book pages near the book's binding, although with some imperfections. These imperfections may be tolerable for making readable xerographic copies from books, but they cause severe problems in scanning the contents of books for digitizing purposes using less expensive desktop scanners. Furthermore, the imperfections caused by the use of the suggested cylindrical or cylindrical-like surfaces to construct the lens's bottom surface are amplified with the thickening of the lens's extension arms. The requirement of very thin extension leaves makes it difficult to manufacture using existing economical plastic fabricating processes without sacrificing its performance. Thus, the fundamental surface curvature must be redefined to substantially lower the manufacturing cost and benefit users by providing affordable book copying corrective lenses.

SUMMARY OF THE INVENTION

In accordance with the present invention, there is provided a substantially flexible, freely movable, and easily manufacturable corrective lens that yields undistorted copies of adjacent book pages presented for xerographic copying or scanning. The corrective lens is substantially large and rectangular in shape to cover various sizes of books. The lens is placed between the spread pages of the book to be copied and the document glass of the copier. The corrective lens has a mid-portion or center section extending into the crease of a typical opened book where it changes the focal point to accommodate the variable height of the text disposed at the inner edge of the pages. The lens extends outwardly from the center section to form substantially flat side portions, which structurally keep the pages of the open book in place during the copying procedure.

In order to assist the users of this lens in producing copies from books, the lens must be able to help them overcome the following four commonly faced problems: the compression of the image of the text, the blurring of the image of the text, the widened and darkened centerline, and the missing information recorded in the crease between facing book pages. To date, there is neither any scientific theory or principles available to do this nor any existing guidelines to point in the direction of the development of such a surface contour. Therefore, an innovative idea or breakthrough is needed.

A particular surface contour governed by a higher-order skewed hyperbolic-like equation was tried with astonishing results. The prototype lenses were built using surfaces with contours based on this equation and with substantially thicker extension leaves. They were tested and proven capable of simultaneously solving all of the aforementioned problems. Hereinafter, in order to simplify the name of this particularly shaped surface, the higher-order skewed hyperbolic-like curvilinear surface is called the curvilinear skewed hyperbolic surface or, simply, the skewed hyperbolic surface. Mathematically, the x- and y-coordinate relationship of a point on the contour of this particular type of curvilinear surface is governed, or can be defined, by the following equation:

$$(X+Xo)\times(Y+Yo)^n=A+f(X,Y) \tag{1}$$

where:

- X is the x-directional Cartesian coordinate position of a point on the curve;
- Y is the y-directional Cartesian coordinate position of that point on the curve;
- Xo is an empirically determined X-positional constant for the curve;
- Yo is an empirically determined y-positional constant for the curve;
- n is an empirically determined skew power constant having a value between 0.9 and 2.5 for this particular application;

A is an empirically determined x-directional shape factor of the curve; and f(X,Y) is an empirically determined small second-order correction factor that corrects the curvatures of the surfaces near the tip of the bottom surface as well as the connections between the curved center lens portion and the flat extension arms.

In the actual design, sections of these particularly shaped surfaces are used to construct the most optically crucial bottom surface of the lens.

From an image formation viewpoint, it is preferable to have the lens's top and bottom surfaces constructed using sections of differently curved skewed-hyperbolic surfaces. However, the lens's top surface also serves as a mechanism to stop and keep the surfaces of inside pages of the book to be copied at a predetermined position for better image projection. In addition, it is not as optically crucial as the bottom surface for obtaining a sharp and properly decompressed image of the book pages residing on the lens's top surface. Therefore, similar to the inventor's previous lens design, the lens's top surface is composed of surfaces with contours closely resembling the surface contour of the surfaces of inside pages of a typical thick textbook when it is opened and pressed upon a flat surface. The resemblance between the book's surface and the lens's top surface assures intimate contact when the book is opened and pressed onto the lens's top surface.

In order to further improve the performance of this newly developed corrective lens, the top surfaces of this lens are slightly modified. The two halves of the lens's top surface are slightly pushed further apart outwardly from the center to assure the intimate contact between the lens's top surface and the surfaces of the book's inside pages. In addition, the ridge of the lens's top surface is made slightly higher and sharper to make it capable of opening the crease further for better scanning of the text inside the crease. Furthermore, the portions of top surface near the bottom edges of the lens are slightly modified to smoothen the transitions of the lens's extension leaves from curved surfaces to flat top surfaces.

The extension arms or leaves of the lens are large, relatively thin, and rectangular in shape with almost constant cross-sections through their full length. They are thin but not substantially thin so as to prevent the lens from being injection molded.

The innovation of using higher-order curvilinear hyper-elliptical surfaces in this invention effectively improves the performance of the simple corrective lens, allowing the lens to help scan and digitize recorded text on inside pages of books. This also allows manufacturability using existing low-cost plastic fabricating processes without losing performance. Thus, the lens can be mass-produced at a substantially low manufacturing cost, benefiting anyone wishing to conduct book copying or scanning. The alternative design proposed in this invention extends its application to books two inches thick or more without substantially sacrificing the quality of the copies.

A lens with symmetrical left-hand and right-hand halves is most suitable for helping make clear copies of pages for most books. However, for making copies of the first and last few pages of a book, a non-symmetrical lens fits better to the non-symmetrical contour of the inside pages of a thick book. Therefore, the lens can be varied to accommodate different top surface contours.

Furthermore, the curvatures of the sloped portions of the inside pages of an opened, thick book are quite different and less curved than those of a thinner book. Therefore, as shown in FIG. 11, the profiles of the center lens portions of the top surfaces must be raised higher to accommodate the less curved surfaces; in other words, deepen the crease of the opened, thick book. As a result, a portion of these surfaces adjacent to the ridge would be raised higher than the maximum height that the lens can compensate. Although the portions of book pages residing on these portions of the lens may be within the binding edge margin and contain no text, the images would still appear blackened due to severe blurring.

In order to erase or white-out these unsightly darkened marks from the copies, one may coat these small portions of the bottom surfaces with opaque paint or cover them with films or thin covers.

In most cases, very thick books are also large in size and cannot fit two full pages within the boundary of the document glass of an ordinary copier. Therefore, a user of this corrective lens can only copy one page at a time. The partial image of the other page is unnecessary and, sometimes even undesirable. Thus, it is suggested in this invention to offset the top surfaces and the bottom surfaces. With one more degree of freedom allowed by this offsetting, the right-hand side of the lens in FIG. 11 can be designed to clearly capture a larger area of the book page or deepen the crease formed by the opposite book pages. On the other hand, this offset will double the width of the blackened area in the image of the left-hand page, normally unnecessary anyway. Similarly, the entire unnecessary side of a partial page image can be optically erased or whited out with paint, film, or a thin cover.

The lens improves the quality of the copies produced from the inside pages of a book simultaneously in five ways:

1) It works as an optical lens to project an image of the book surface closer to the copier's document support glass than the actual surfaces of the book pages, thus, helping the copier's lens to better focus and produce a crisp image of the book surface near its binding.
2) It optically stretches or decompresses the book image near its binding. As a result, the images of characters or pictures in this area are stretched back to their original shapes printed on the inside pages of the book.
3) The ridge helps to open up the book near the binding, enabling the images of the characters and pictures in this area to be more clearly scanned by the copier.
4) The top surfaces of the lens work as a guide to help the inside pages easily and smoothly slide outward without being squeezed toward each other.
5) It enables the use of thicker extension leaves to ease the difficulty in manufacturing without scarifying the lens's performance.

It is an object of this invention to provide improved means of perfecting the performance of the corrective lens of U.S. Pat. No. 6,313,954 and make it capable of helping users conduct text scanning and digitizing from inside pages of thick books or bound volumes.

It is another object of this invention to provide an improved means of making this lens capable of being inexpensively mass-produced using existing conventional plastic fabricating processes without losing valuable performance.

A further object of this invention is to provide improved means for compensating for the distance between the crease of a book and regions proximate thereto, during a photocopying process that does not require complex structural modifications to conventional copying machines.

It is a further object of this invention to provide improved means for the lens to act as a wedge to spread the pages of a book closest to the binding thereof.

It is a further object of this invention to provide an improved freely movable lens for placement between an open book to be copied and the document glass of a copier, wherein the lens changes its local focal point in accordance with the distance between the book page's surface and the copier's document glass across the crease.

A further object of this invention is to provide means to alter the lens and make it capable of producing clear, crisp, and distortion-free copies or scanned images from extra thick books.

BRIEF DESCRIPTION OF THE DRAWINGS

A complete understanding of the present invention may be obtained by reference to the accompanying drawings, when considered in conjunction with the subsequent detailed description, in which:

FIG. 3 depicts another plan view of typically distorted adjacent pages of the book copied by pressing down the book harder onto the copying machine shown in FIG. 1;

FIG. 10 illustrates a plan view of the adjacent pages of a typical thick reference book copied utilizing the lens suggested in FIGS. 8 and 9.

DESCRIPTION OF THE PREFERRED EMBODIMENT

Generally speaking, the invention features a-corrective lens for copying pages of a book pressed flat on the document glass of a xerographic copy machine or an electronic document scanner. It is made of a rigid or semi-rigid optically transparent material like glass, acrylic, polycarbonate, nylon, or other plastic material. The surfaces of the lens may be covered with a protective coating to increase their resistance to scratching and scoring.

The corrective lens is specially shaped to enable a snug fit in the space formed between the inside pages of the book to be copied and the document supporting glass of the copier without substantially lifting the book. The corrective lens has a substantially pyramidal center extending into the crease of a typical book. The lens fans out from the pyramidal center to extend to substantially flat side portions.

Figure 1:
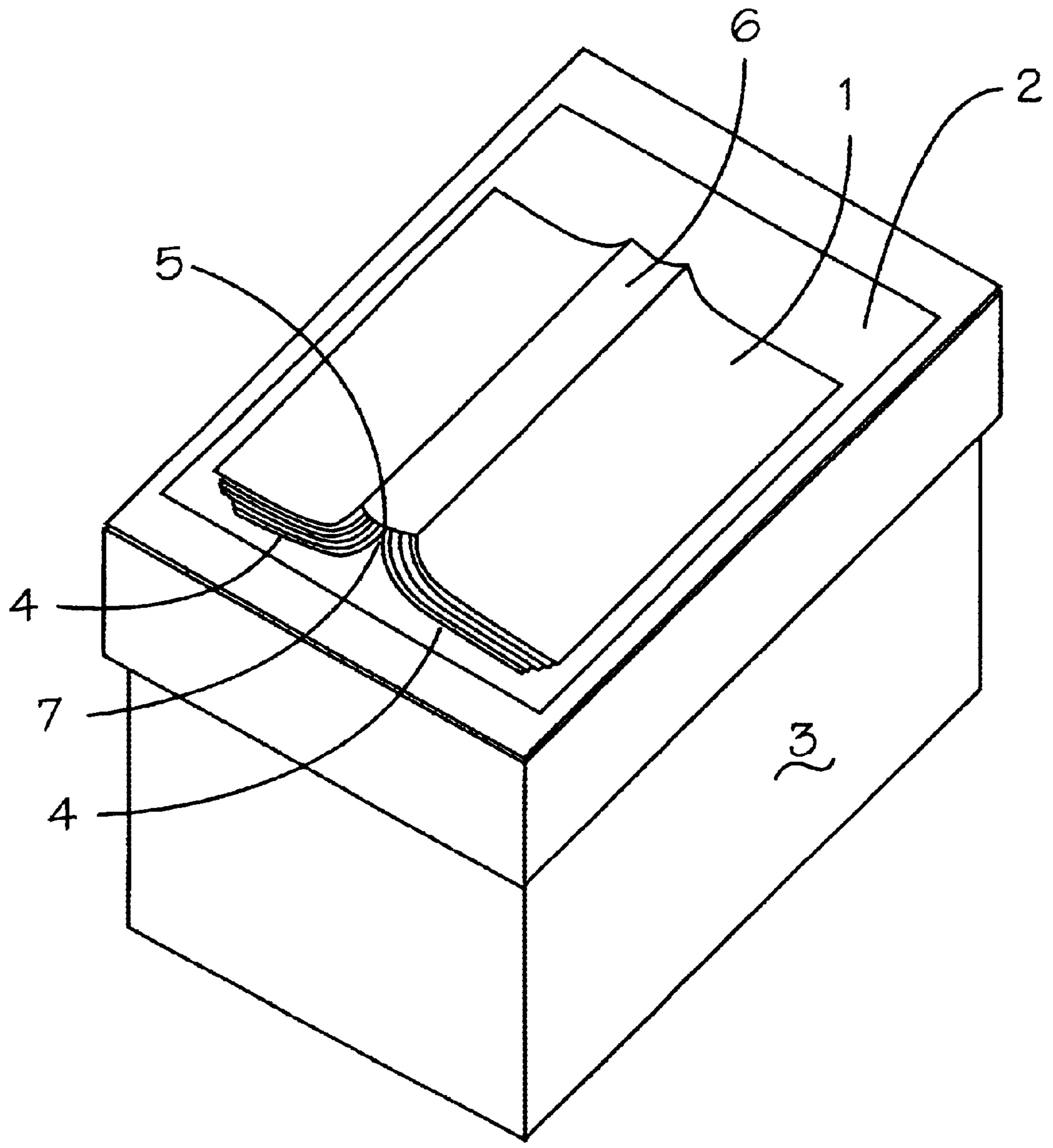
Figure 1 PRIOR ART
FIG. 1 illustrates a perspective view of a book that is disposed upon the document glass of a typical xerographic copying machine.

Now referring to FIG. 1, a perspective view is illustrated of a book 1 that is pressed against the document supporting glass 2 of a typical xerographic copying machine 3. It will be observed that the binding 6 of the book 1 is relatively stiff, and the crease 5 between book pages or leaves 4 forms a pyramidal void 7 between the book 1 and the glass 2.

The crease 5 of typical textbooks generally pyramids upwardly away from the glass 2, thus causing an upside-down, V-shaped void 7, as shown. The lens of a typical copying machine 3 cannot capture the text or information disposed in the crease 5, resulting in distorted copies, as shown in FIGS. 2 through 4.

Figure 2:
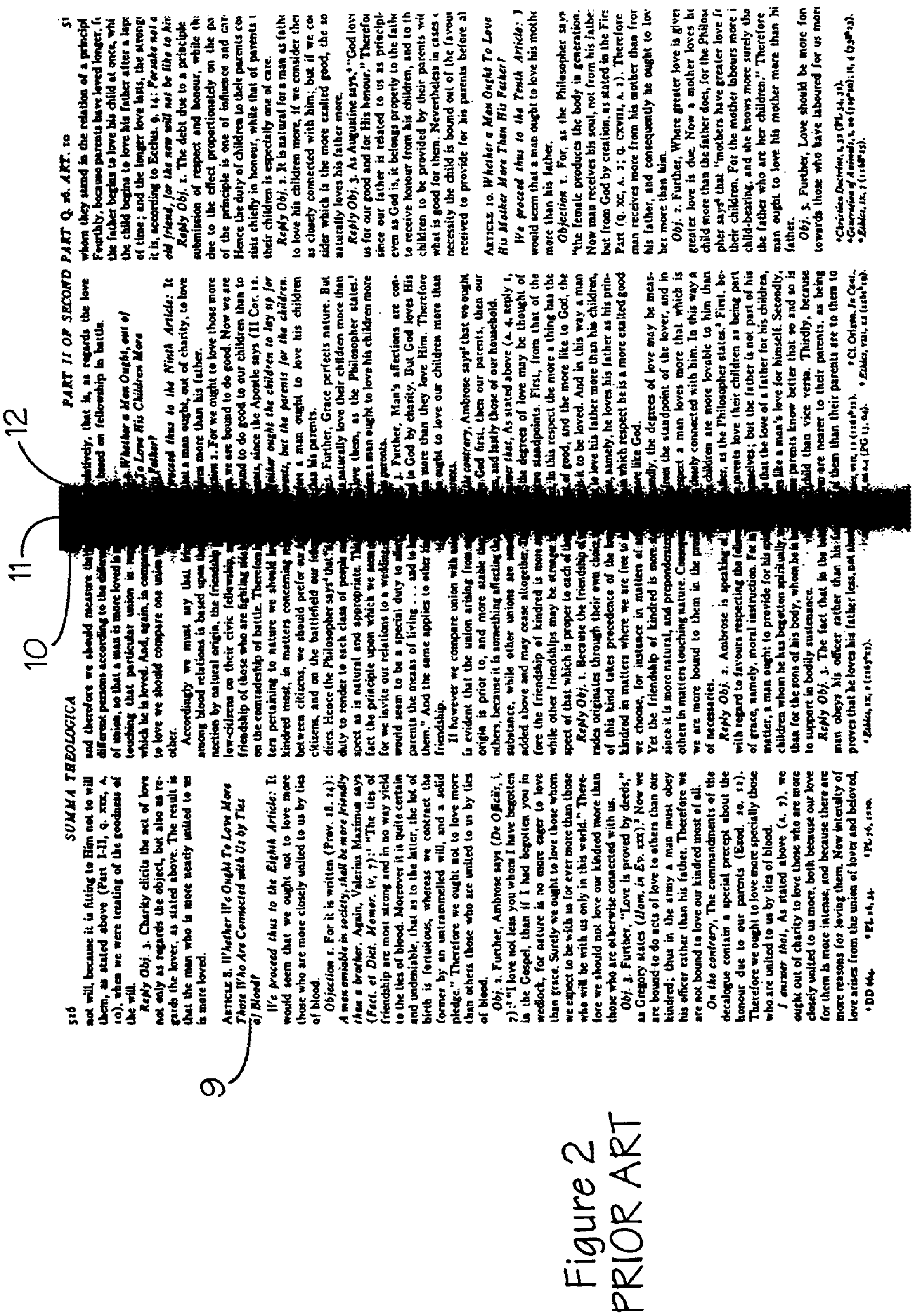
Figure 2 PRIOR ART
FIG. 2 shows a plan view of typically distorted adjacent pages of the book copied by the copying machine shown in FIG. 1.

FIG. 2 illustrates a photocopied sheet 9 produced by a conventional copier such as shown in FIG. 1, illustrating that the image of the crease 10 can be distorted with text 12 that runs into a wide black centerline 11.

FIG. 3 depicts a typical copy of the book pages where the binding is pressed toward the glass, as shown in FIG. 1. It will be observed that the text 16 disappears into a black centerline 15, appearing much narrower than that of the centerline shown in FIG. 2.

Figure 4:
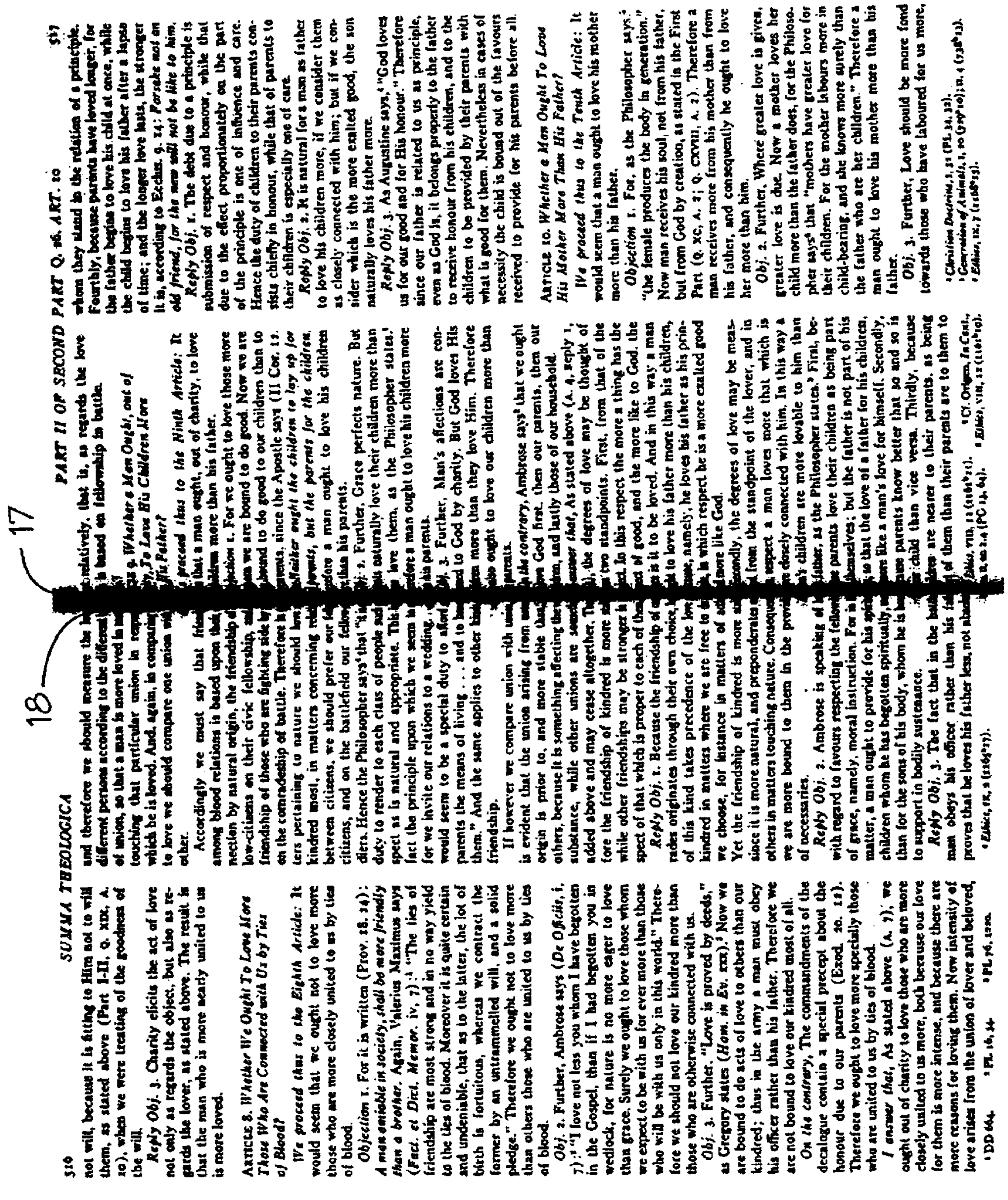
Figure 4 PRIOR ART
FIG. 4 illustrates still another plan view of typically distorted adjacent pages of the book copied by pressing down the book very hard onto the copying machine shown in FIG. 1.

FIG. 4 depicts a copy of the book after a substantially greater force is applied to the binding than was applied to either of the copies depicted in FIGS. 2 and 3. It will be observed that although the centerline 17 is substantially diminished in width and blackness, text 18 still runs into the centerline 17 and is illegible.

Figure 5:
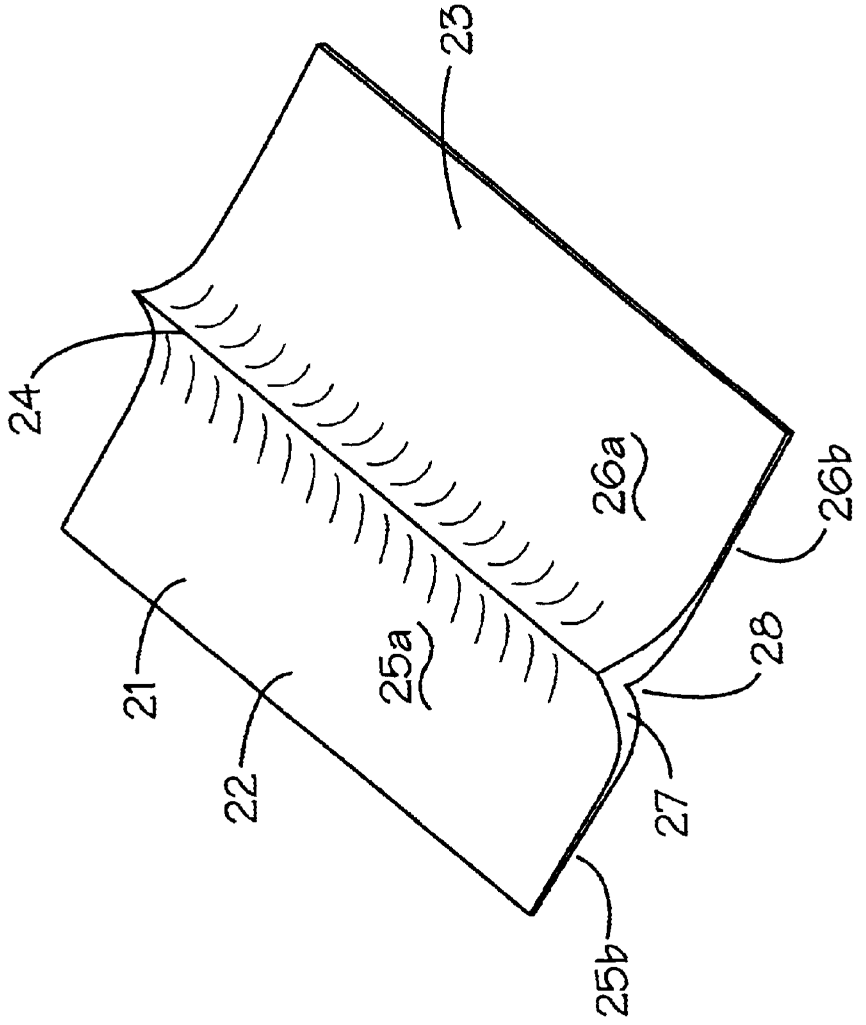
Figure 5 PRIOR ART
FIG. 5 depicts a perspective view of an unimproved corrective lens having two very thin extended flat leaves and a thicker center portion with cylindrical bottom surfaces as described in U.S. Pat. No. 6,313,954.

FIG. 5 shows the optical copying corrective or compensation lens in U.S. Pat. No. 6,313,954 that is closely similar to the present invention. It is basically composed of three parts: a thick curvilinear optical lens 27 in the center, and two extension leaves or arms 22 and 23 spread outward from each side of the center lens 27. The only optically functional part of the lens 27 is the center portion. The main purpose of the extension leaves 22 and 23 is to eliminate the glitches in the copies caused by light deflections along the edges of the center lens 27. The surface contours of the center lens 27 are basically a composition of sections of circular surfaces or circular-like elliptical surfaces.

Figure 6:
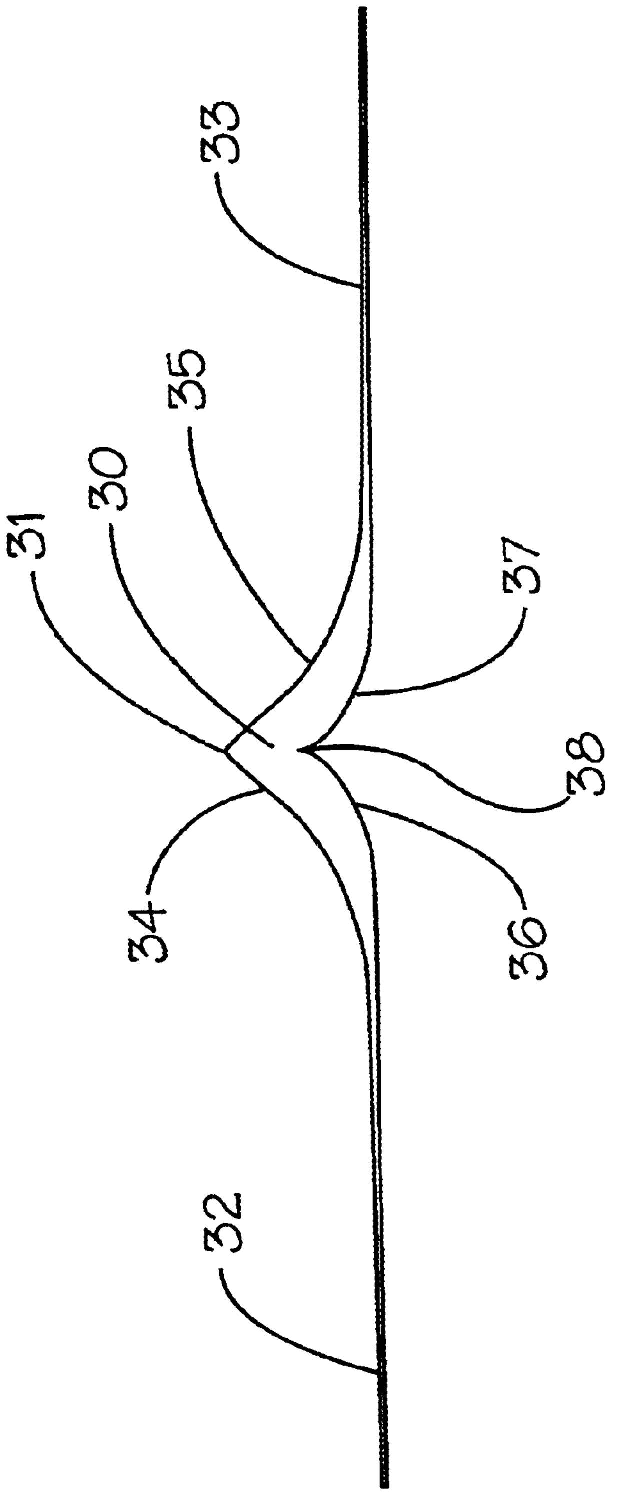
Figure 6 PRIOR ART
FIG. 6 shows a sectional side view of the corrective lens depicted in FIG. 5.

FIG. 6 is a more detailed sectional side view of the corrective lens shown in FIG. 5. The extension leaves 32 and 33 are substantially thin. The contours of the left- and right-hand halves of the upper surfaces 34 and 35 as well as the lower surfaces 36 and 37 of the center lens portion 30 of the apparatus are basically circularly shaped.

Figure 7:
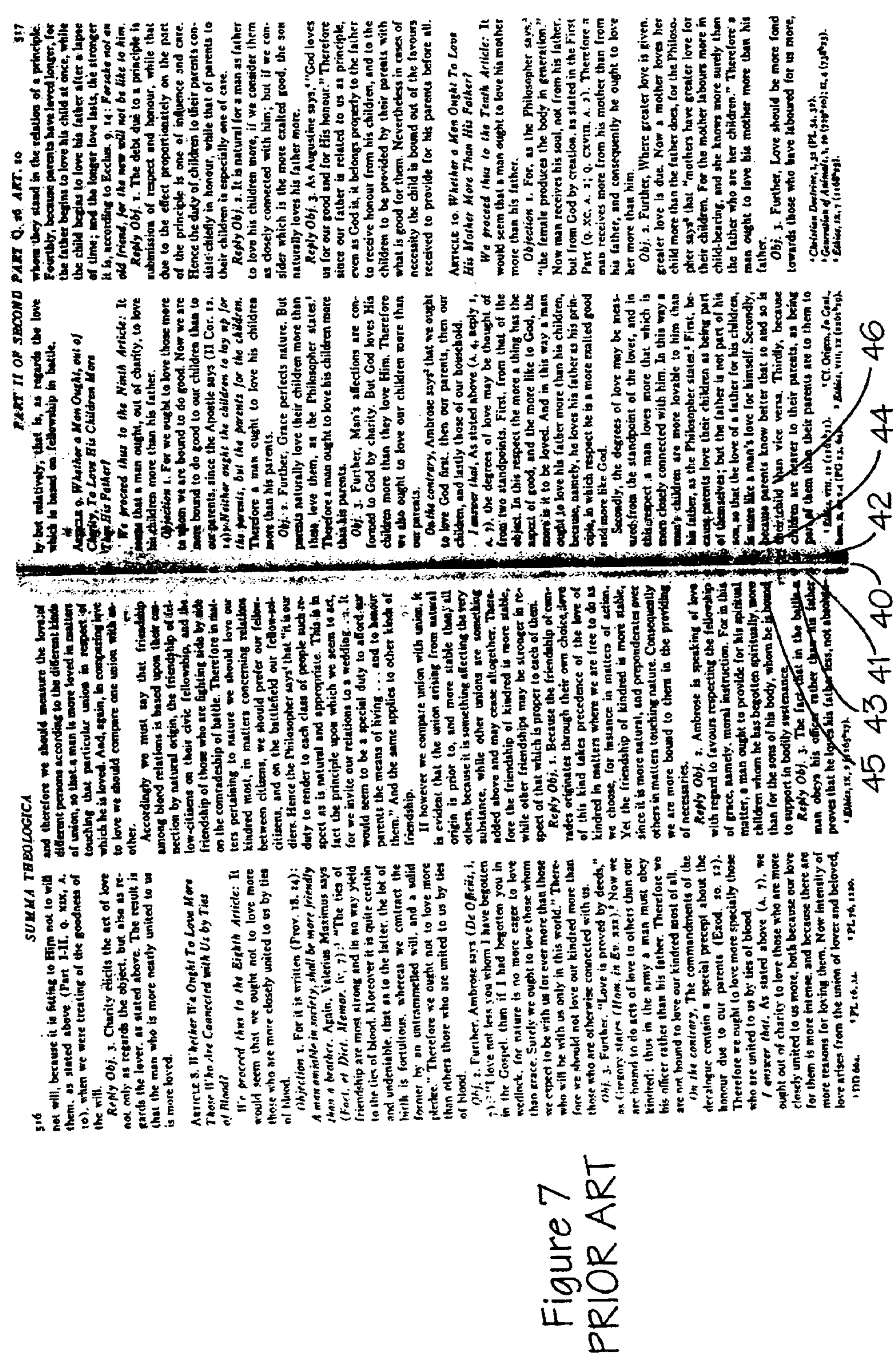
Figure 7 PRIOR ART
FIG. 7 shows a plan view of a xerographic copy of adjacent pages of a book, using the unimproved corrective lens as shown in FIGS. 5 and 6 but with a pair of slightly thicker extension leaves.

FIG. 7 illustrates a photocopy of the inside page of a thick book produced by a conventional xerographic copier using the corrective lens shown in FIG. 5 but with thicker (0.050 inch) extension leaves. It is obvious that the text of the entire page is quite legible; however, the image of the crease adjacent the binding of the opened book is obviously unsightly and slightly distorted. The centerline 40 is widened. There are also two strips of darkened marks 41 and 42 next to and along the centerline 40. The last few columns of characters 43 and 44 next to the binder margins are over-magnified and appear larger and darker than normal. Characters 45 and 46 a little bit further away from the centerline 40 are slightly compressed or under-magnified. Although these characters 43 to 46 are legible, they may not be electronically recognizable by the software of less expensive electronic scanners.

Figure 8:
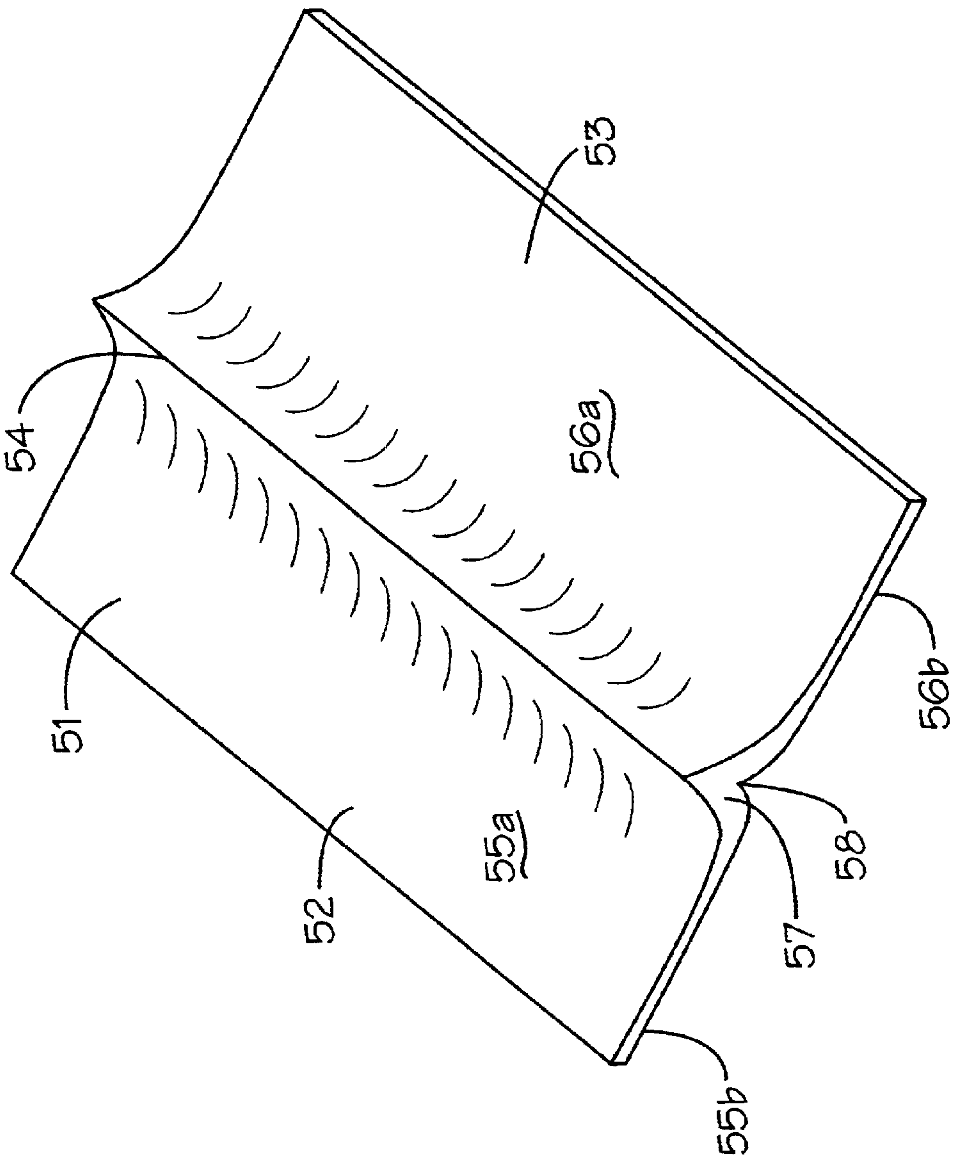
FIG. 8 depicts a perspective view of the corrective lens in accordance with this invention.
Figure 9:
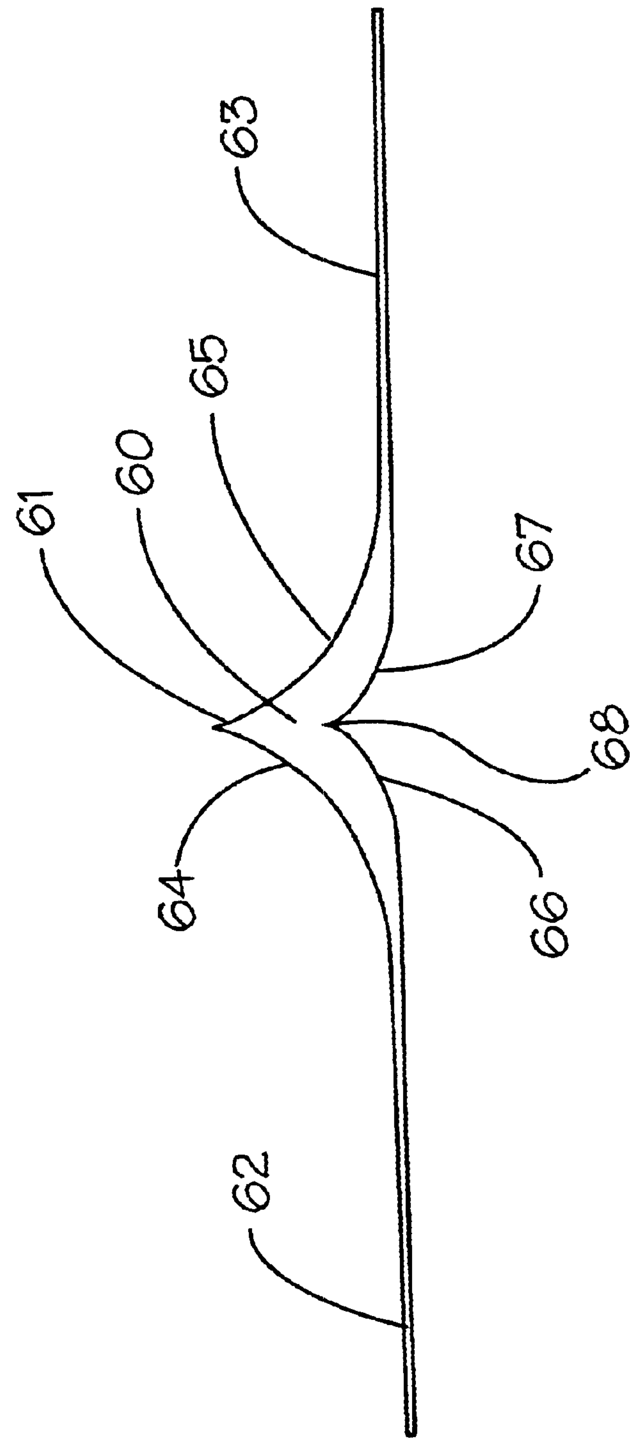
FIG. 9 shows a sectional side view of the improved corrective lens depicted in FIG. 8.

Referring to FIGS. 8 and 9, an improved optical compensation lens 51 of this invention is shown. The lens 51 is designed to fit inside the tight space between the book and the document supporting glass of the copier shown in FIG. 1. The lens 51 comprises an optically transparent material like glass, Lucite®, Plexiglas®, polycarbonate, nylon, acrylic, or other types of transparent materials.

In FIG. 8, the upper surface 55*a* and 56*a* of lens 51, as well as the lower surface 55*b* and 56*b* may be coated with a thin, protective, non-abrasive material like Teflon or silicon-based coating to enhance its resistance to scratching and scoring. The leaves 52 and 53 are thin but not substantially thin enough to prevent them from being injection molded. They have a nearly constant cross-sectional shape along their full length until the center portion 57 is reached. The center portion 57 is an optical lens severely distorted to a nearly triangular shape to enable it to fit snugly inside the crease of the open book as the book lies flat and is pressed on the document supporting glass, as illustrated in FIG. 1.

The lens 51 has a variable focal length to compensate the variation of distance between the flat document supporting glass and the surfaces of the book pages residing on the lens's top surfaces 55*a* and 56*a*. As the lens approaches the crease 58 from its leaves 52 and 53, the lens portion 57 thickens towards the center 54, which peaks in a pyramidal fashion.

The contour of respective top surfaces 55*a* and 56*a* resembles the surface contour of the inside pages 4 in FIG. 1. Therefore, when an opened book is placed on top of and is pressed on lens 51, the inside page surface 4 to be copied can rest upon, and make intimate contact with, the top surfaces 55*a* and 56*a* of the lens 51.

In operation, the wedge shaped ridge 54 is pressed into the pyramidal void between the adjacent pages, the force of such procedure allowing the wedge shaped ridge 54 to spread the pages of the book so that the contour of the book's inside pages 4 thereof matches the curvature of the ridge 54. Thus, this area 7 in FIG. 1 is opened for the copier to properly scan the text of both pages 4, without obstruction. In order to enhance the performance, the ridge 54 is made sharper and taller. In addition, the two halves 55*a* and 56*a* of the top surface are made farther apart from the center of the lens portion 57 to assure intimate contact between the book pages and the lens's top surface.

The slope of the bottom surface 55*b* and 56*b* of lens 51 may be (but is not necessarily) similar to that of the corresponding top surface 55*a* and 56*a*. Although the shapes of the top 55*a* and 56*a* and bottom surfaces 55*b* and 56*b* are approximately similar, their detailed curvatures are different so that the lens 51 can properly compensate the image of the book surface.

The bottom surface 55*b* and 56*b* of this lens 51 is composed of sections of surfaces with curvatures defined by the curvilinear skewed-hyperbolic equation given previously.

The sections of surfaces near the connections between the center lens 57 and extending leaves 52 and 53 are slightly modified to smoothen the abrupt curvature change from curved surfaces to flat surfaces of the extension leaves 52 and 53. The extension leaves 52 and 53 are substantially thin but still thick enough for letting this lens 51 be manufactured using existing less expensive plastic fabrication processes. They are also large and rectangular shaped, with a nearly constant cross-section along their span. The extension arm 52 on the left-hand side of the lens 51 is longer than the length of the right-hand extension arm 53. The purpose of the differential length of the extension arms 52 and 53 is to provide the user of this lens 51 the freedom to duplicate the text in either a single page of a large book or, more economically, duplicate the text in both adjacent pages of a smaller book onto a single piece of copying paper.

The sectional view with an enlarged center lens portion shown in FIG. 9 illustrates the lens's 51 improvements. The extension leaves 62 and 63 are thin but obviously thicker than the extension leaves 32 and 33 shown in FIG. 6. The ridge 61 of the center lens portion is higher and sharper for making it easier to insert into the crease of the book to open up and spread the book pages, as shown in FIG. 1. The main bodies of the lens portion of the top surfaces 64 and 65 are circular with corrections near the ridge 61 and connections between the curved portions and flat portions of these surfaces. The curved lens portion of the bottom surfaces 66 and 67 are portions of higher-power hyperbolic curves with a slight correction near its apex 68 and connection between these curved portions and flat portions of the bottom surfaces 66 and 67.

FIG. 10 shows the text in the two opposite book pages 71 clearly and crisply duplicated without visible distortion or missing information recorded on these pages. The separation line 70 between the images of these adjacent book pages is thin, clear, and crisp.

Figure 11:
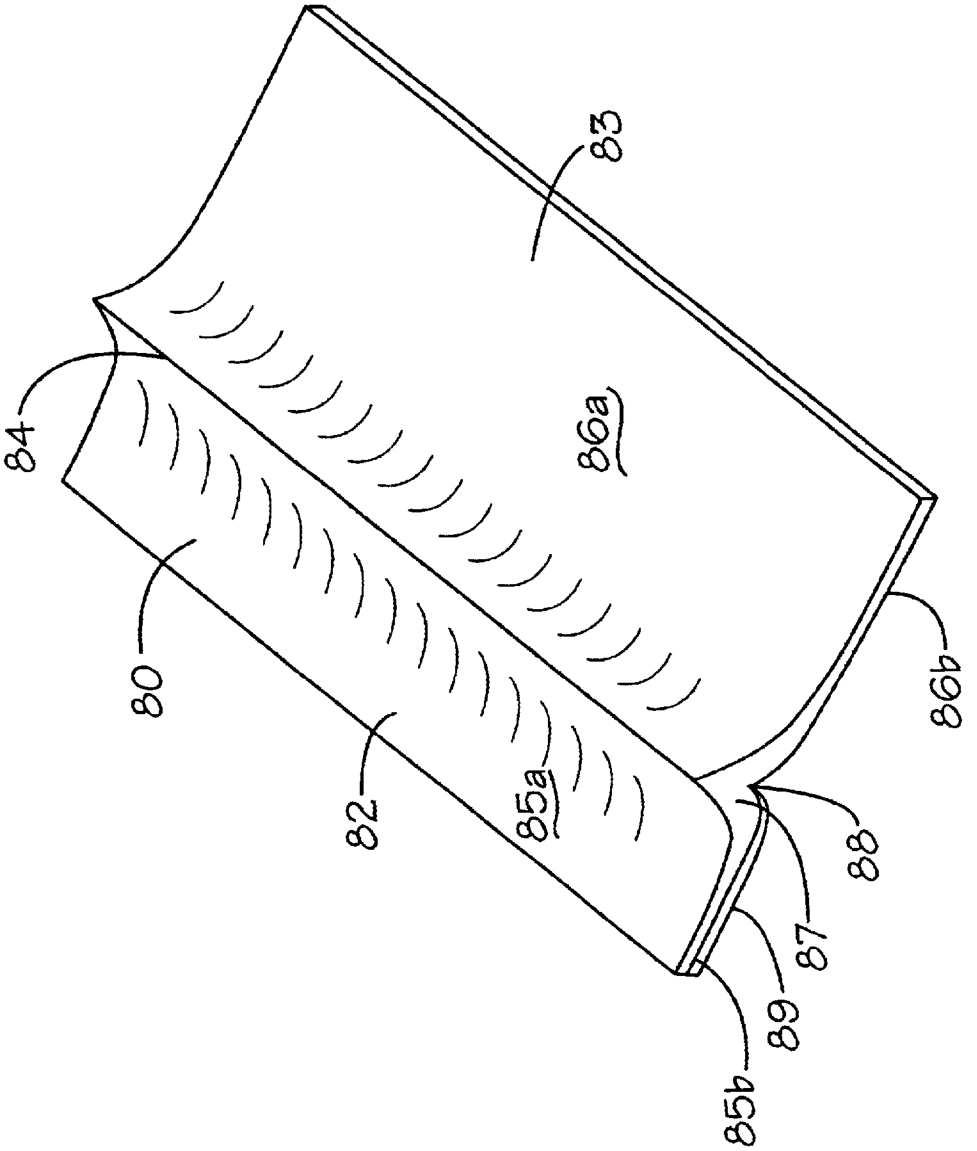
FIG. 11 depicts a perspective view of an alternate embodiment of this invention.

Referring to FIG. 11, an alternate embodiment 51 of the lens 80 is shown. The lens 80 is made with less curved top surfaces 85*a* and 86*a* to accommodate the less curved surface contour of a book two or more inches thick. Thus, the book pages residing on the curved portions of the lens 80 will be pushed higher than that of a book residing on the top surface of the lens 51. As a result, the part of the book pages on the lens's surface near the ridge 84 will be blurred and leave an unsightly darkened mark in the copy. Therefore, the bottom surfaces 85*b* and 86*b* are shifted toward one side of the lens 80; in this case, it is the right-hand side. This offset arrangement of the top 85*a* and 86*a* and bottom 85*b* and 86*b* surfaces improves the appearance of the copies by not capturing the blurred image of a binding area in which there is no text in most cases.

A thin cover or thin opaque film 89 is attached on the bottom side 85 of the left side of the lens 80. This cover or film 89 is used to block the light passing through the portion of the lens 80 on which it is attached so that the copier (not shown) will not capture the image of the portion of the book page residing on the left-side top surface 85*a* of the portion of the lens 80 that is covered by the cover or film 89. Thus, it optically removes or eliminates the unsightly blackened marks and the undesirable partial page image from the copies produced using lens 80. Since the left half of the lens 80 is nonfunctional, its extension leave 82 is designed to be substantially shorter for easy handling and storage.

This cover or film 89 can be made either as an integral part of the lens 80 or a separate part, easily attachable to and removable from the bottom surface of the lens 80. Although this cover 89 doesn't enhance the functions of the lens 80, it adds some desirable features as well as value to the lens 80, benefiting users at a minimal cost. Of course, the application of this cover or film 89 is not limited to this particular lens 80. It can also be made for and applied to the general purpose lens shown as 51 in FIG. 8 as an inexpensive add-on feature for the convenience of users.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters patent is presented in the subsequently appended claims.

What is claimed is:

1. A corrective lens that yields substantially undistorted copies of adjacent open book pages presented for xerographic copying or document scanning upon a document support glass of a copier or scanner, comprising:

a) a substantially transparent element for placement over various sizes of open books, said transparent element having a mid-portion that fits within, and contours to, a crease of the open book adjacent a binding thereof, said mid-portion of said transparent element having local focal length changing means, comprising a top surface formed by two sections of a nearly cylindrical curvilinear surface and a bottom surface formed by two sections of a higher-order skewed hyperbolic-like curvilinear surface, for changing its focal point at each location on the lens based on the varying distance between the book pages residing on the lens's top surface and the copier's document supporting glass across the said crease, in order to present a substantially non-blurred and undistorted image of said edge of each adjacent page of said open book as it lies upon a document support glass of said copier; and b) integral extension arms extending outwardly from said mid-portion to cover the entire or part of the remainder of the open book and hold said pages in place.

2. The corrective lens in accordance with claim 1, wherein said extension arms are substantially flat, thereby covering a page surface of said open book.

3. The corrective lens in accordance with claim 1, wherein said extension arms are substantially devoid of focal length changing means.

4. The corrective lens in accordance with claim 1, wherein said extension arms are each substantially rectangular.

5. The corrective lens in accordance with claim 1, wherein said local focal length changing means comprises a portion of a curvilinear surface resembling the entire or a portion of the natural surface contour of a thick book opened and pressed on a flat surface or a surface shaped similar to such a surface as its top surface.

6. The corrective lens in accordance with claim 1, wherein said extension arms are substantially flexible.

7. The corrective lens in accordance with claim 1, wherein the said bottom surface of the mid-portion of lens is not aligned with the top surface, for the purpose of eliminating the unsightly and blurred image of the portion of the inner margin of the book page of a very thick book; that is, the ridges of the top and the bottom surfaces are not aligned to a common vertical line perpendicular to the flat bottom surfaces of the extension arms.

8. The corrective lens in accordance with claim 1, wherein said extension arms are different in their length in the direction perpendicular to the ridge of the mid-portion lens.

9. The corrective lens in accordance with claim 1, wherein the bottom side of one side or a part of one side of the lens is covered by a thin film or cover which is either made easily attachable and removable or as an integral part of the lens to prevent it from projecting the portion of the image of the surface of the undesirable book page or partial page to the copying machine during a book copying or scanning process.

10. The corrective lens in accordance with claim 1, wherein said mid-portion and said extension arms are coated with a non-abrasive material.

11. The corrective lens as in any of claims 2–4, or 5–9, wherein said mid-portion and said extension arms are coated with a non-abrasive material.

12. A portable, freely disposable, corrective lens that yields substantially undistorted copies of adjacent open book pages presented for xerographic copying or document scanning upon a document support glass of a copier or scanner, comprising:

a) a substantially transparent, movable lens element for placement over various sizes of open books, said transparent element having a mid-portion that fits within, and when pressed against the open book, contours to, a crease thereof adjacent a binding thereof, said mid-portion of said transparent element having local focal length changing means, comprising a top surface formed by two sections of a nearly cylindrical curvilinear surface and a bottom surface formed by two sections of a higher-order skewed hyperbolic-like curvilinear surface, for changing its focal point at each location on the lens based on the varying distance between the book pages residing on the lens's top surface and the copier's document supporting glass across the said crease, in order to present a substantially non-blurred and undistorted image of said edge of each adjacent page of said open book as it lies upon a document support glass of said copier; and b) integral extension arms extending outwardly from said mid-portion to cover the entire or part of the remainder of the open book and hold said pages in place.

13. The corrective lens in accordance with claim 12, wherein said extension arms are substantially flat, thereby covering a page surface of said open book.

14. The corrective lens in accordance with claim 12, wherein said extension arms are substantially devoid of focal length,changing means.

15. The corrective lens in accordance with claim 12, wherein said extension arms are each substantially rectangular.

16. The corrective lens in accordance with claim 12, wherein said focal length changing means comprises a portion of a curvilinear surface resembling the entire or portion of the natural surface contour of a thick book opened and pressed on a flat surface or a surface shaped similar to such a surface as its top surface.

17. The corrective lens in accordance with claim 12, wherein said extension arms are substantially flexible.

18. The corrective lens in accordance with claim 12, wherein the said bottom surface of the mid-portion of lens is not aligned with the top surface, for the purpose of eliminating the unsightly and blurred image of the portion of the inner margin of the book page of a very thick book; that is, the ridges of the top and bottom surfaces are not aligned to a common vertical line perpendicular to the flat bottom surfaces of the extending arms.

19. The corrective lens in accordance with claim 12, wherein said extension arms are different in their length in the direction perpendicular to the ridge of the mid-portion lens.

20. The corrective lens in accordance with claim 12, wherein the bottom side of one side or a part of one side of the lens is covered by a film or cover which is either made attachable and removable or as an integral part of the lens to prevent it from projecting the portion of the undesired image of the book pages to the copying machine during a book copying or scanning process.

21. The corrective lens in accordance with claim 12, wherein said mid-portion and said extension arms are coated with a non-abrasive material.

22. The corrective lens as in any of claims 13–15, or 16–20, wherein said mid-portion and said extension arms are coated with a non-abrasive material.

* * * * *